(12) United States Patent
Patil et al.

(10) Patent No.: US 9,804,650 B2
(45) Date of Patent: Oct. 31, 2017

(54) SUPPLY VOLTAGE NODE COUPLING USING A SWITCH

(71) Applicant: QUALCOMM Incorporated, San Diego, CA (US)

(72) Inventors: Sanjay Bhagawan Patil, Austin, TX (US); Daniel Stasiak, Austin, TX (US); Martin Pierre Saint-Laurent, Austin, TX (US)

(73) Assignee: QUALCOMM Incorporated, San Diego, CA (US)

( * ) Notice: Subject to any disclaimer, the term of this patent is extended or adjusted under 35 U.S.C. 154(b) by 121 days.

(21) Appl. No.: 14/603,130

(22) Filed: Jan. 22, 2015

(65) Prior Publication Data

US 2016/0070323 A1    Mar. 10, 2016

Related U.S. Application Data

(60) Provisional application No. 62/045,916, filed on Sep. 4, 2014.

(51) Int. Cl.
*G06F 1/26* (2006.01)
*G06F 1/32* (2006.01)

(52) U.S. Cl.
CPC ............ *G06F 1/263* (2013.01); *G06F 1/26* (2013.01); *G06F 1/266* (2013.01); *G06F 1/3253* (2013.01); *Y02B 60/1235* (2013.01)

(58) Field of Classification Search
CPC . G06F 1/26; G06F 1/263; G06F 1/266; G06F 1/3253; G06F 1/3203

USPC .......... 327/544, 427, 309; 326/30; 713/322, 713/340, 323, 320, 324, 300
See application file for complete search history.

(56) References Cited

U.S. PATENT DOCUMENTS

| 7,391,232 B1 | 6/2008 | Bose et al. |
| 7,594,127 B2 * | 9/2009 | Sutardja ............... G06F 1/26 713/300 |
| 8,615,672 B2 | 12/2013 | Henry et al. |
| 2004/0108870 A1 * | 6/2004 | Ko .......................... G05F 1/56 326/30 |
| 2008/0307244 A1 * | 12/2008 | Bertelsen ............. G06F 1/3203 713/323 |

(Continued)

FOREIGN PATENT DOCUMENTS

| EP | 1168356 A1 | 1/2002 |
| WO | 9635177 A1 | 11/1996 |

(Continued)

OTHER PUBLICATIONS

International Search Report and Written Opinion for International Application No. PCT/US2015/041810, ISA/EPO, dated Sep. 29, 2015, 13 pages.

*Primary Examiner* — Aurel Prifti
(74) *Attorney, Agent, or Firm* — Qualcomm Incorporated-Toler

(57) ABSTRACT

An apparatus includes a first node configured to provide a first supply voltage to a first device and a second node configured to provide a second supply voltage to a second device. The apparatus further includes a bus configured to communicatively couple the first device and the second device. The apparatus also includes a switch configured to couple the first node and the second node.

30 Claims, 4 Drawing Sheets

(56) References Cited

U.S. PATENT DOCUMENTS

| | | | |
|---|---|---|---|
| 2009/0174469 A1* | 7/2009 | Fallah | H03K 19/0016 327/544 |
| 2011/0109371 A1* | 5/2011 | Kastl | G06F 1/3203 327/427 |
| 2011/0193620 A1 | 8/2011 | Hollis | |
| 2012/0023351 A1* | 1/2012 | Wakrat | G06F 1/3203 713/322 |
| 2012/0117391 A1* | 5/2012 | Jacquet | G06F 1/263 713/300 |
| 2012/0151240 A1* | 6/2012 | Robinson | G06F 1/263 713/340 |
| 2012/0273929 A1 | 11/2012 | Jiang | |
| 2013/0073884 A1* | 3/2013 | Ulmer | G06F 1/3203 713/320 |
| 2014/0361823 A1* | 12/2014 | Lundberg | H03K 19/0008 327/309 |
| 2015/0082069 A1* | 3/2015 | Bose | G06F 1/3287 713/324 |

FOREIGN PATENT DOCUMENTS

| | | |
|---|---|---|
| WO | 2011026470 A1 | 3/2011 |
| WO | 2013137865 A1 | 9/2013 |
| WO | 2014047823 A1 | 4/2014 |

\* cited by examiner

SUPPLY VOLTAGE NODE COUPLING USING A SWITCH

I. CROSS-REFERENCE TO RELATED APPLICATION

The present application claims the benefit of U.S. Provisional Patent Application No. 62/045,916, filed Sep. 4, 2014 and entitled "SUPPLY VOLTAGE NODE COUPLING USING A SWITCH," the content of which is incorporated by reference herein in its entirety.

II. FIELD

The present disclosure is generally related to electronic devices and more particularly to supply voltages for electronic devices.

III. DESCRIPTION OF RELATED ART

Advances in technology have resulted in smaller and more powerful computing devices. For example, there currently exist a variety of portable personal computing devices, including wireless computing devices, such as portable wireless telephones, personal digital assistants (PDAs), tablet computers, and paging devices that are small, lightweight, and easily carried by users. Many such computing devices include other devices that are incorporated therein. For example, a wireless telephone can also include a digital still camera, a digital video camera, a digital recorder, and an audio file player. Also, such computing devices can process executable instructions, including software applications, such as a web browser application that can be used to access the Internet and multimedia applications that utilize a still or video camera and provide multimedia playback functionality.

A computing device or other electronic device may include multiple components that perform various operations. Operation of the components may draw different currents from a power source of the computing device, which can alter supply voltages provided to the components. For example, operation of a particular component can increase or decrease supply voltages provided to other components of the computing device (based on whether the component is drawing less current or more current from the power source). In some cases, variation in the supply voltages may be associated with poor performance or a malfunction of the computing device, such as by causing device operation to deviate from a target range of operating conditions.

IV. SUMMARY

An apparatus includes a first device (e.g., a first processor core), a second device (e.g., a second processor core), and a switch. The first device and the second device may communicate using a bus, such as a synchronous bus. The switch may couple a first node that provides a first supply voltage to the first device and a second node that provides a second supply voltage to the second device. The switch may substantially "equalize" the first supply voltage and the second supply voltage during communication between the first device and the second device by providing a low-impedance path between the first node and the second node. Providing the low-impedance path may reduce or avoid instances of delay and clock variations at the bus that can be caused by variation between the first supply voltage and the second supply voltage.

In a particular aspect an apparatus includes a first node configured to provide a first supply voltage to a first device and a second node configured to provide a second supply voltage to a second device. The apparatus further includes a bus configured to communicatively couple the first device and the second device. The apparatus also includes a switch configured to couple the first node and the second node.

In another particular aspect, a method includes providing a first supply voltage to a first device. The first supply voltage is provided to the first device via a first node. The method further includes providing a second supply voltage to a second device. The second supply voltage is provided to the second device via a second node. The method further includes activating a switch to couple the first node and the second node.

In another particular aspect, an apparatus includes means for providing a first supply voltage to a first device and means for providing a second supply voltage to a second device. The apparatus further includes means for communicatively coupling the first device and the second device. The apparatus also includes means for coupling the means for providing the first supply voltage and the means for providing the second supply voltage.

In another particular aspect, a non-transitory computer-readable medium stores instructions that are executable by a processor to initiate operations. The operations include activating a switch to couple a first node and a second node. The first node provides a first supply voltage to a first device, and the second node provides a second supply voltage to a second device. The first device and the second device are communicatively coupled via a bus.

One particular advantage provided by at least one of the disclosed aspects is improved performance of an electronic device, such as an electronic device that includes multiple processor cores that communicate using a synchronous bus. By providing a low-impedance path between nodes that provide supply voltages to the processor cores, variations in the supply voltages can be reduced or avoided. Thus, clock variations caused by "mismatch" of the supply voltages can be reduced or avoided, improving operation of the electronic device. Other aspects, advantages, and features of the present disclosure will become apparent after review of the entire application, including the following sections: Brief Description of the Drawings, Detailed Description, and the Claims.

V. BRIEF DESCRIPTION OF THE DRAWINGS

VI. DETAILED DESCRIPTION

Figure 1:
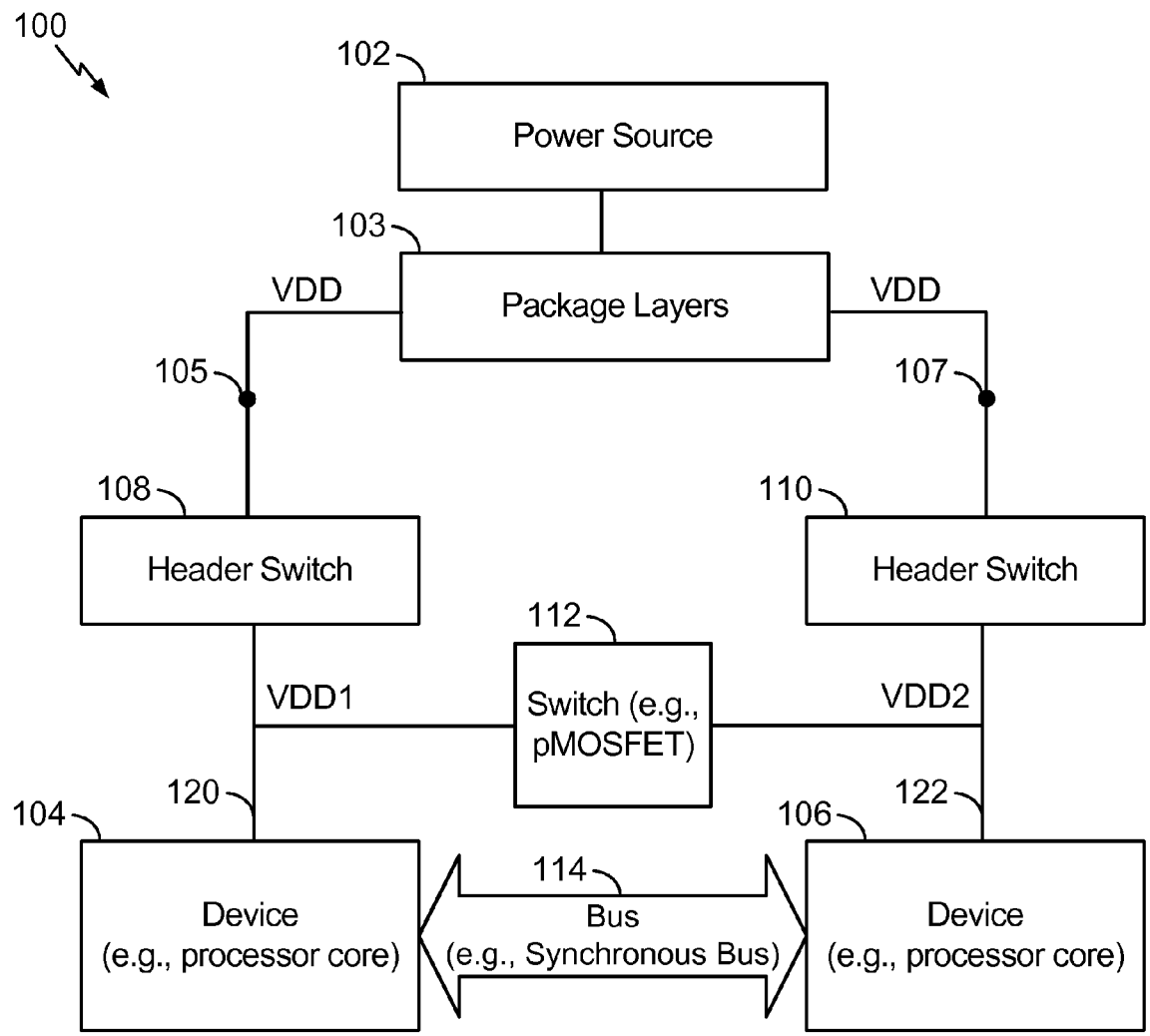
FIG. 1 is a block diagram of a particular illustrative aspect of an electronic device that includes a switch.

Referring to FIG. 1, an electronic device 100 includes a first device 104 (e.g., a first processor core), and a second device 106 (e.g., a second processor core). The first device 104 and the second device 106 may be included in a common integrated circuit. In another implementation, the first device 104 is included in a first integrated circuit, and the second device is included in a second integrated circuit. The first integrated circuit and the second integrated circuit may have a stacked die configuration, such as a stacked three-dimensional (3D) configuration, as an illustrative example.

The electronic device 100 further includes a power source 102, a first header switch 108, and a second header switch 110. The power source 102 is configured to generate a supply voltage (VDD). The first header switch 108 is configured to generate a first supply voltage (VDD1) based on the supply voltage VDD, and the second header switch 110 is configured to generate a second supply voltage (VDD2) based on the supply voltage VDD.

The first device 104 is configured to receive the first supply voltage VDD1 via a first node 120, and the second device 106 is configured to receive the second supply voltage VDD2 via a second node 122. The first device 104 is coupled to the first header switch 108 via the first node 120, and the second device 106 is coupled to the second header switch 110 via the second node 122. In a particular aspect, the header switches 108, 110 each include a p-type metal-oxide-semiconductor field-effect transistor (pMOSFET). The header switches 108, 110 may each correspond to a block header switches (BHS) that perform power-gating functions at the electronic device 100 by selectively decoupling the nodes 120, 122 from the supply voltages VDD1, VDD2. The header switches 108, 110 may have similar or the same sizes (e.g., may have similar transistor width-to-length ratios). The header switches 108, 110 may be arranged in a parallel configuration.

In an illustrative implementation, the electronic device 100 is a packaged semiconductor device, and the supply voltage VDD is routed through one or more package layers 103. The package layers 103 may include one or more redistribution layers (RDLs) of the packaged semiconductor device, one or more other layers, or a combination thereof. The supply voltage VDD may be routed from the one or more package layers 103 to the header switches 108, 110 via bumps 105, 107. For example, the bump 105 may include a first flip chip bump, and the bump 107 may include a second flip chip bump. An example of a flip chip bump is a controlled collapse chip connection (C4). The bumps 105, 107 may be arranged in a parallel configuration.

The electronic device 100 further includes a switch 112 (e.g., an equalization switch), such as a pMOSFET. The switch 112 may have a low impedance when the switch 112 is activated. For example, a drain-to-source path of a transistor (or a source-to-drain path of a transistor) may be a low impedance path when the transistor is activated via a gate voltage at a gate terminal of the transistor. To further illustrate, a transistor width-to-length ratio of the switch 112 may be selected to facilitate low impedance between the nodes 120, 122 when the switch 112 is activated. As used herein, "low impedance" may refer to an impedance such that the first supply voltage VDD1 and the second supply voltage VDD2 are substantially equalized (e.g., when a difference between the first supply voltage VDD1 and the second supply voltage VDD2 is less than a threshold voltage, such as approximately 0.1 millivolts (mV), as an illustrative example). As another example, the switch 112 may have a "low impedance" when the switch 112 is activated (e.g., turned on) as compared to when the switch 112 is deactivated (e.g., turned off).

The electronic device 100 further includes a bus 114 configured to communicatively couple the first device 104 and the second device 106. The bus 114 may correspond to a synchronous bus in which communications are sent and received using a common clock signal. In a particular aspect, the electronic device 100 further includes a memory (not shown) that is accessible to the first device 104 and that is supplied by the first supply voltage VDD1.

The switch 112 is configured to provide a low-impedance path between the nodes 120, 122 in response to communication between the first device 104 and the second device 106. For example, the switch 112 may be activated (e.g., turned on) in response to a communication over the bus 114 (e.g., while the devices 104, 106 exchange results of computations, provide status information, or perform other device-to-device operations, as illustrative examples). Activation of the switch 112 may substantially equalize the supply voltages VDD1, VDD2 (e.g., may cause the supply voltages VDD1, VDD2 to be approximately 0.9 volts, as an illustrative example) by creating a low-impedance path between the nodes 120, 122. The switch 112 may be configured to decouple the nodes 120, 122 in response to one or more of the first device 104 or the second device 106 entering a sleep mode (e.g., after a period of inactivity at the first device 104 or at the second device 106). For example, the switch 112 may be deactivated (e.g., turned off) to decouple the nodes 120, 122.

During operation, one or both of the devices 104, 106 may control the header switches 108, 110 and the switch 112. For example, the first device 104 may deactivate the header switch 108 by asserting a first control signal at a gate terminal of a pMOSFET of the header switch 108. The first device 104 may assert the first control signal in response to a period of inactivity of the first device 104, such as in response to expiration of a particular number of clock cycles without execution of an instruction, as an illustrative example. To further illustrate, the second device 106 may deactivate the header switch 110 by asserting a second control signal at a gate terminal of a pMOSFET of the header switch 110. The second device 106 may assert the second control signal in response to a period of inactivity of the second device 106, such as in response to expiration of a particular number of clock cycles without execution of an instruction, as an illustrative example. Deactivation of the header switches 108, 110 may conserve power at the electronic device 100, such as by drawing less current from the power source 102.

In a particular aspect, the switch 112 is activated while both the header switches 108, 110 are activated. For example, the electronic device 100 may include circuitry having an input coupled to the nodes 120, 122 and an output coupled to the switch 112. The circuitry may be configured to activate the switch 112 while the header switches 108, 110 are activated. As a non-limiting, illustrative example, the switch 112 may include a pMOSFET, and the circuitry may include a NAND logic gate having inputs coupled to the nodes 120, 122 and having an output coupled to a gate terminal of a pMOSFET. In this example, the pMOSFET may be activated in response to activation of both of the header switches 108, 110, and the pMOSFET may be deactivated in response to deactivation of one or both of the header switches 108, 110. In other implementations, the circuitry may be response to enable signals received from the devices 104, 106. For example, the circuitry may include an AND logic gate or a NAND logic gate that is responsive to enable signals received from the devices 104, 106.

Alternatively or in addition, the electronic device 100 may include circuitry coupled to the bus 114. The circuitry may be configured to detect communication at the bus 114

(e.g., by "snooping" the bus 114) and to activate the switch 112 in response to detecting communication at the bus 114. The circuitry may be configured to deactivate the switch 112 while communication is not occurring at the bus 114. In this example, the switch 112 may be occasionally deactivated while the header switches 108, 110 are active (e.g., while the devices 104, 106 are active but not exchanging communications via the bus 114).

Alternatively or in addition, the electronic device 100 may include circuitry configured to determine a difference between the supply voltages VDD1, VDD2. For example, the circuitry may include a comparator coupled to the nodes 120, 122. The comparator may be configured to compare the supply voltages VDD1, VDD2 to determine a difference and to compare the difference to a threshold (e.g., a reference voltage). If the difference satisfies (e.g., exceeds) the threshold, the comparator may activate the switch 112. If the difference fails to satisfy the threshold, the comparator may deactivate the switch 112.

The switch 112 may be employed as a fine-grain power-gating device or as a coarse-grain power gating device. To illustrate, one or more of the header switches 108, 110 and the switch 112 may be controlled by another device not shown in FIG. 1. For example, a power management integrated circuit (PMIC) may access any of the header switches 108, 110 and the switch 112. The PMIC may perform coarse-grain (or primary) power-gating functions, and the switch 112 may be employed for fine-grain (or auxiliary) power-gating functions. Alternatively or in addition, components of the electronic device 100 are included in a digital signal processor (DSP) that controls certain operations associated with the electronic device 100. The DSP may perform coarse-grain power-gating functions. An example of a DSP that includes the devices 104, 106 and the bus 114 is described further with reference to FIG. 4.

Activation of the switch 112 may substantially "equalize" the supply voltages VDD1, VDD2, such as by providing a low-impedance path between the nodes 120, 122. As a result, variation between VDD1 and VDD2 is reduced. Reducing the variation may improve clock timing and/or reduce latency at the bus 114 (e.g., by avoiding clock skew), improving performance of the electronic device 100.

In addition, the examples of FIG. 1 enable supply voltage equalization in connection with synchronous communication between the devices 104, 106. Certain conventional designs may compensate for supply voltage differences by using an asynchronous bus between devices. In some applications, the asynchronous bus may be slow and/or difficult to design or debug. FIG. 1 illustrates that supply voltage equalization may be achieved in connection with synchronous communication at the bus 114, which may improve performance and which may simplify circuit design and debugging processes.

Figure 2:
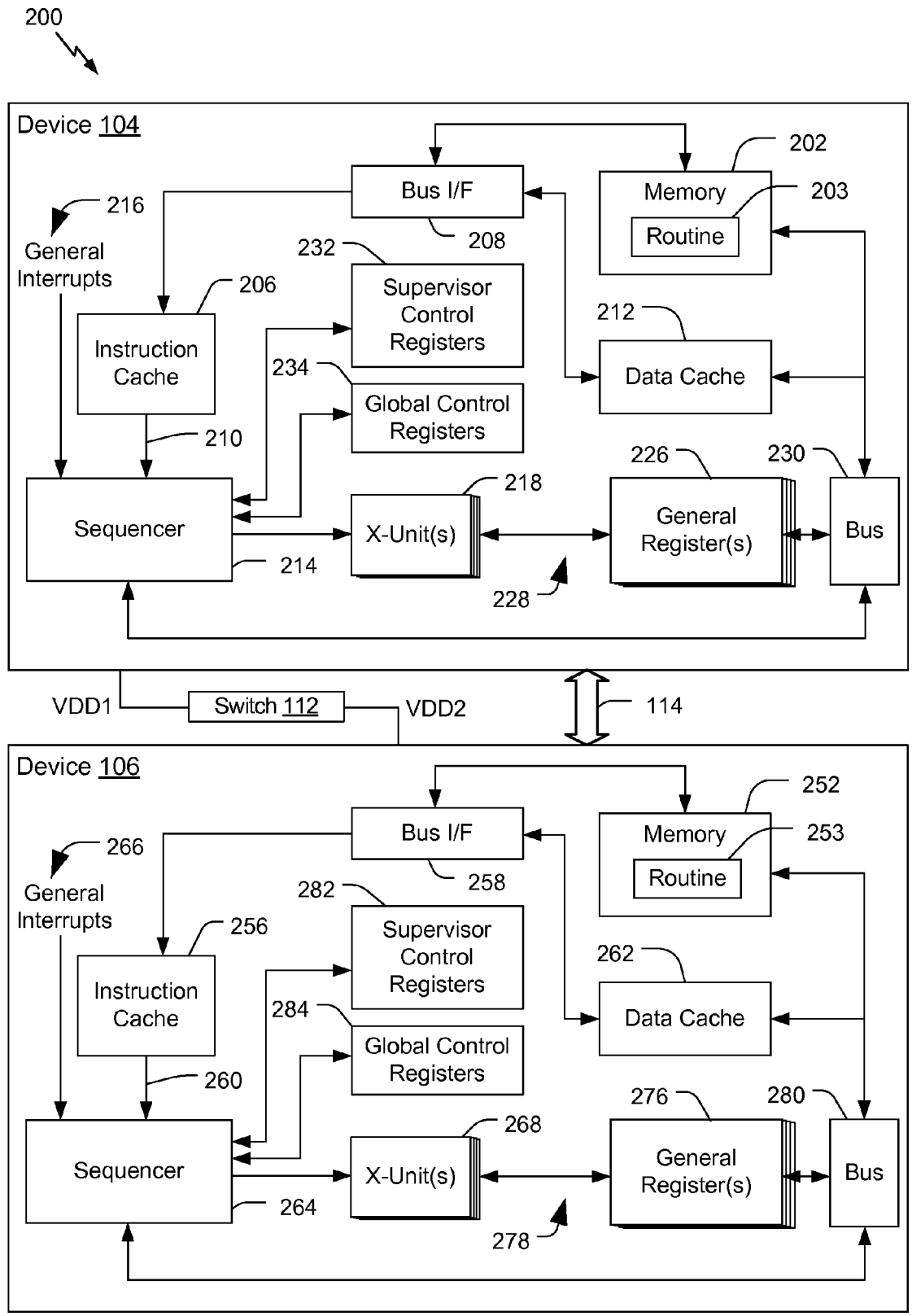
FIG. 2 is a block diagram of a particular illustrative aspect of certain components of the electronic device of FIG. 1.

FIG. 2 is a block diagram of a particular illustrative aspect of an electronic device 200. Certain components of the electronic device 200 may be as described with reference to FIG. 1. For example, the electronic device 200 may include the devices 104, 106, the switch 112, and the bus 114. It should be appreciated that the configurations of the devices 104, 106 of FIG. 2 are provided for illustrative purposes and that configurations of the devices 104, 106 may depend on the particular application.

In the example of FIG. 2, the first device 104 includes a memory 202. The memory 202 may be coupled to an instruction cache 206 and to a data cache 212 via a bus interface 208. The instruction cache 206 may be coupled to a sequencer 214 by a bus 210. Additionally, the sequencer 214 may be configured to receive interrupts, such as general interrupts 216, which may be received from an interrupt register (not shown in FIG. 2). The sequencer 214 may be further coupled to supervisor control registers 232 and to global control registers 234.

In a particular aspect, the instruction cache 206 is coupled to the sequencer 214 via a plurality of current instruction registers, which may be coupled to the bus 210. The sequencer 214 may be coupled to one or more execution units 218. Each of the one or more execution units 218 may be coupled to a general register file 226 via a bus, such as a bus 228. The general register file 226 can also be coupled to the sequencer 214, the data cache 212, and the memory 202 via a bus 230. The supervisor control registers 232 and the global control registers 234 may store bits that may be accessed by control logic within the sequencer 214 to determine whether to accept interrupts and to control execution of instructions by the first device 104.

FIG. 2 further illustrates that the second device 106 may include a memory 252. The memory 252 may be coupled to an instruction cache 256 and to a data cache 262 via a bus interface 258. The instruction cache 256 may be coupled to a sequencer 264 by a bus 260. Additionally, the sequencer 264 may be configured to receive interrupts, such as general interrupts 266, which may be received from an interrupt register (not shown in FIG. 2). The sequencer 264 may be further coupled to supervisor control registers 282 and to global control registers 284.

In a particular aspect, the instruction cache 256 is coupled to the sequencer 264 via a plurality of current instruction registers, which may be coupled to the bus 260. The sequencer 264 may be coupled to one or more execution units 268. Each of the one or more execution units 268 may be coupled to a general register file 276 via a bus, such as a bus 278. The general register file 276 can also be coupled to the sequencer 264, the data cache 262, and the memory 252 via a bus 280. The supervisor control registers 282 and the global control registers 284 may store bits that may be accessed by control logic within the sequencer 264 to determine whether to accept interrupts and to control execution of instructions by the second device 106.

Depending on the particular application, the bus 114 may be coupled to various components of the devices 104, 106. For example, the bus 114 may be coupled to the buses 230, 280, and the execution units 218, 268 may communicate via the buses 230, 280. Alternatively or in addition, the bus 114 may be coupled to bus interfaces 208, 258 and/or to one or more other components of the devices 104, 106. In certain applications, the memories 202, 252 may correspond to memory spaces that are included in a common (or "shared") memory that is accessible to the execution units 218, 268.

During operation, the first device 104 may be responsive to the first supply voltage VDD1, and the second device 106 may be responsive to the second supply voltage VDD2. The first device 104 may access instructions (e.g., from the memory 202) and may execute the instructions at the one or more execution units 218. The second device 106 may access instructions (e.g., from the memory 252) and may execute the instructions at the one or more execution units 268. The instructions may be executable to perform certain operations described herein.

For example, the instructions may specify a duty cycle associated with one or more of the devices 104, 106. The duty cycle may specify a range of operating conditions, such as a time duration that the devices 104, 106 are to be active (e.g., by processing instructions) versus a time duration that the devices 104, 106 are to be inactive (e.g., in a standby mode or asleep). The switch 112 may be deactivated while one or more of the devices 104, 106 are inactive.

In a particular aspect, an indication of the duty cycle is stored at one or more of the memories 202, 252, such as in connection with a routine 203 executable by the one or more execution units 218 and/or a routine 253 executable by the one or more execution units 268. In this example, the routine 203 may specify the first device 104 is to initiate deactivation of the switch 112 in response to entering the inactive mode. The routine 253 may specify that the second device 106 is to initiate deactivation of the switch 112 in response to entering the inactive mode. The routines 203, 253 may specify that the devices 104, 106 are to initiate activation of the switch 112 (or to cease deactivating the switch 112) in response to entering the active mode. For example, the devices 104, 106 may periodically enter the active mode, such as to determine whether one or more operations are to be performed (e.g., to determine whether one or more tasks are queued). Thus, operation of the switch 112 may depend at least in part on duty cycles of one or more of the devices 104, 106. Alternatively or in addition, the devices 104, 106 may be configured to enter the active mode in response to an interrupt or other signal received from another device. For example, as described further with reference to FIG. 4, the devices 104, 106 may be integrated within a processor, such as a digital signal processor (DSP) that controls operations of the devices 104, 106.

The devices 104, 106 may communicate using the bus 114 by sending and receiving inter-device messages, such as in connection with inter-processor communication (IPC). To illustrate, an inter-processor interrupt (IPI) may be issued by one of the devices 104, 106 in response to accessing a shared resource, such as a memory or cache. For example, if one of the devices 104, 106 modifies the shared resource (e.g., evicts an entry or flushes the shared resource), an IPI may be issued indicating that the shared resource has been modified. Another example of an IPI is an interrupt that indicates initiation of a system-level shutdown operation (e.g., a power-down event at the electronic device 200). Alternatively or in addition, inter-device messaging may include forwarding results of computations (e.g., in connection with a parallel processing operation) and a remote procedure call (RPC) (e.g., when one of the devices 104, 106 requests the other of the devices 104, 106 to "remotely" perform a routine or a subroutine).

The example of FIG. 2 illustrates that the switch 112 can be selectively activated and deactivated in connection with operation of the devices 104, 106. For example, the switch 112 can be selectively activated and deactivated based on execution of instructions at the execution units 218, 268. Power may be conserved at the electronic device 200 by operating the switch based on operation of the devices 104, 106.

Figure 3:
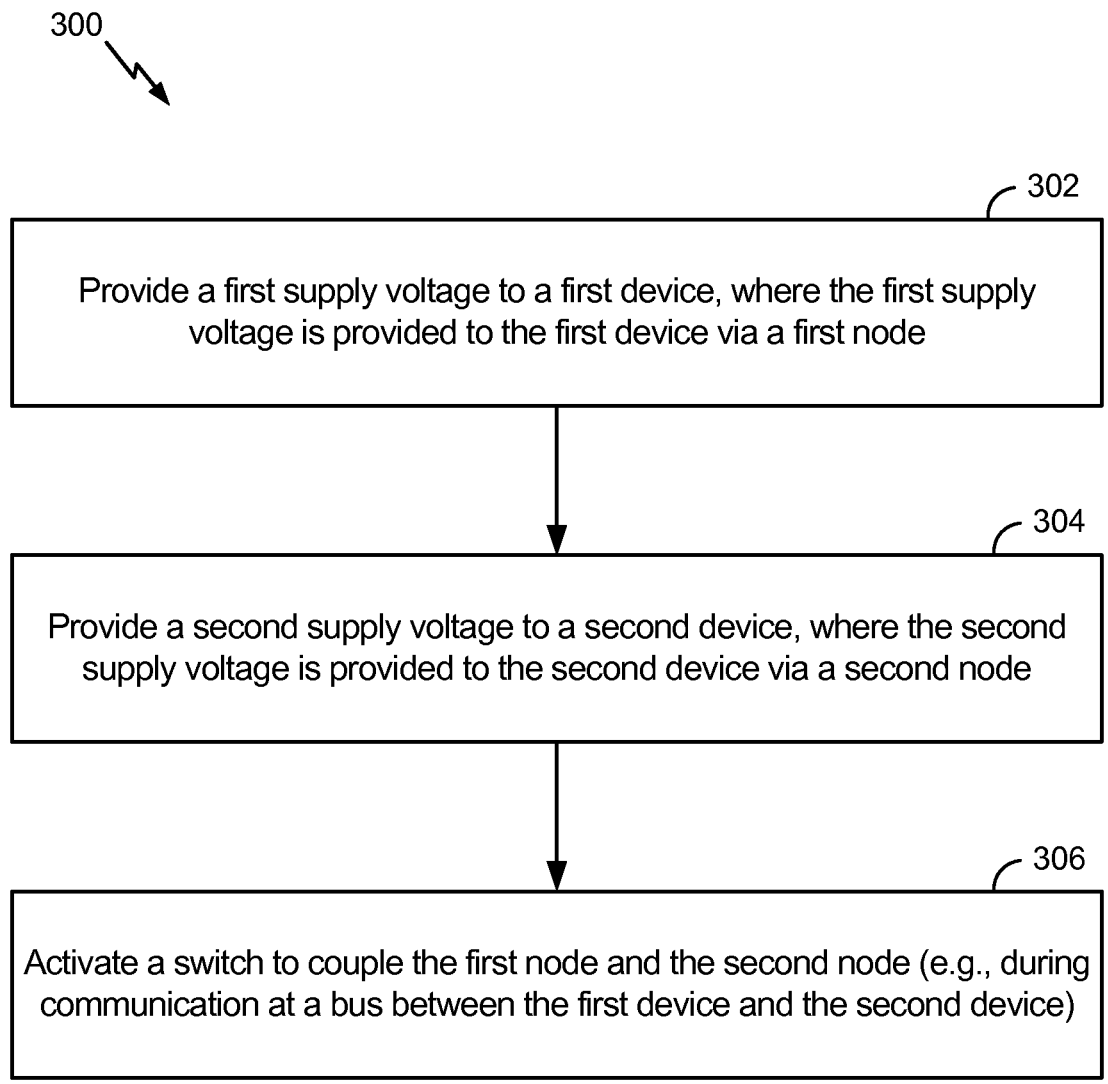
FIG. 3 is a flow chart of a particular illustrative aspect of a method of operation of an electronic device that includes a switch.

Referring to FIG. 3, a particular illustrative aspect of a method is depicted and generally designated 300. For example, the method 300 may be performed by an electronic device. The electronic device may correspond to the electronic device 100 of FIG. 1, the electronic device 200 of FIG. 2, or a combination thereof.

The method 300 may include providing a first supply voltage (e.g., the first supply voltage VDD1) to a first device (e.g., the first device 104), at 302. The first supply voltage may be provided to the first device via a first node, such as the first node 120.

The method 300 may further include providing a second supply voltage (e.g., the second supply voltage VDD2) to a second device (e.g., the second device 106), at 304. The second supply voltage may be provided to the second device via a second node, such as the second node 122.

The method 300 may further include activating a switch (e.g., the switch 112), at 306. Activation of the switch may couple the first node and the second node. As an illustrative, non-limiting example, the switch may activated during communication at a bus between the first device and the second device. In a particular aspect, the bus is a synchronous bus, which may correspond to the bus 114. In this example, communication between the first device and the second device occurs over the synchronous bus.

The first supply voltage may be provided to the first device while a first header switch (e.g., the first header switch 108) is activated, and the second supply voltage is provided to the second device while a second header switch (e.g., the second header switch 110) is activated. In this example, the method 300 may further include deactivating the switch in response to deactivation of one or both of the first header switch or the second header switch. The switch may be activated in response to activation of both the first header switch and the second header switch.

In a particular aspect, the first supply voltage and the second supply voltage are generated using (e.g., derived from) a common power supply, such as a battery of an electronic device. Another illustrative example of an electronic device is described further with reference to FIG. 4.

Figure 4:
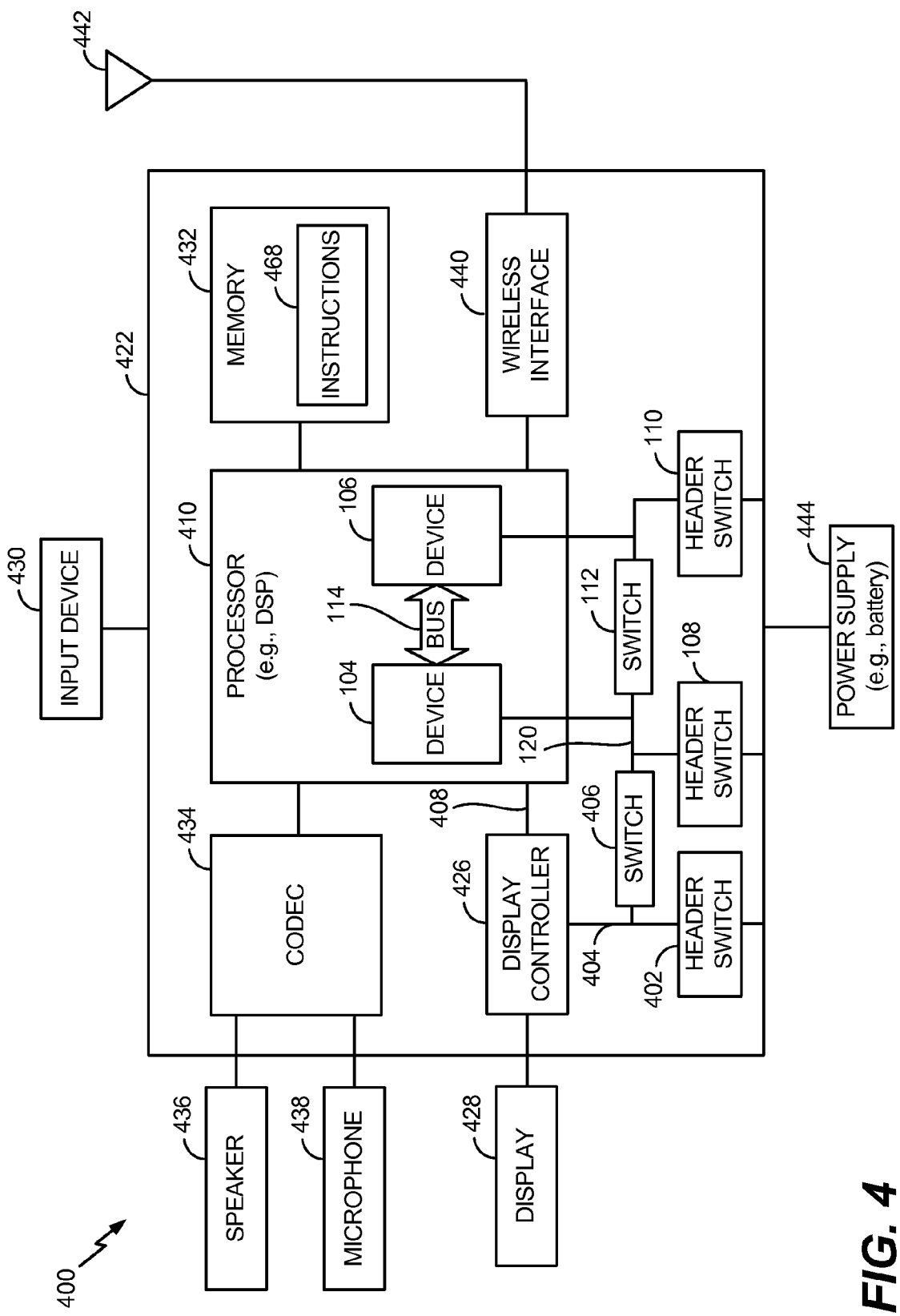
FIG. 4 is a block diagram of an electronic device that includes a switch.

Referring to FIG. 4, a block diagram of a particular illustrative aspect of an electronic device is depicted and generally designated 400. The electronic device 400 may correspond to a mobile device (e.g., a cellular telephone), as an illustrative example. In other implementations, the electronic device 400 may correspond to a computer (e.g., a laptop computer, a tablet computer, or a desktop computer), a set top box, an entertainment unit, a navigation device, a personal digital assistant (PDA), a television, a tuner, a radio (e.g., a satellite radio), a music player (e.g., a digital music player and/or a portable music player), a video player (e.g., a digital video player, such as a digital video disc (DVD) player and/or a portable digital video player), another electronic device, or a combination thereof.

The electronic device 400 includes a processor 410, such as a digital signal processor (DSP). In the example of FIG. 4, the processor 410 includes the devices 104, 106 and may include or be coupled to the header switches 108, 110, the switch 112, and the bus 114. To further illustrate, the devices 104, 106 may correspond to processor cores of the processor 410. It should be appreciated that the processor 410 may include more than two processor cores.

The electronic device 400 may further include a memory 432. The memory 432 is coupled to the processor 410. The memory 432 includes instructions 468 that are accessible by the processor 410. The instructions 468 may include one or more instructions that are executable by the processor 410. For example, the instructions 468 may be executable by the processor 410 to initiate operations of the method 300 of FIG. 3. The instructions 468 may be executable by the first device 104, by the second device 106, by another device of the processor 410, or a combination thereof. The instructions 468 may include any of the routines 203, 253. The instructions 468 may be executable to control (e.g., activate and/or deactivate) one or more switches, such as the switch 112.

FIG. 4 also shows a display controller 426 that is coupled to the processor 410 and to a display 428. A coder/decoder (CODEC) 434 can also be coupled to the processor 410. A speaker 436 and a microphone 438 can be coupled to the CODEC 434. FIG. 4 also indicates that a wireless interface 440, such as a wireless controller and/or a transceiver, can be coupled to the processor 410 and to an antenna 442.

The electronic device 400 may further include a third header switch 402, a second switch 406, and a positive integer number N of devices, where N>1 (e.g., for N=2, N=3, N=4, or N=10, as illustrative examples). For example, in addition to the devices 104, 106, the electronic device 400 may further include a third device coupled to the third header switch 402 via a third node 404. In the example illustrated in FIG. 4, the third device corresponds to the display controller 426. In this example, the display controller 426 may receive a third supply voltage via the third node 404. The second switch 406 may be configured to couple the first node 120 and the third node 404 in response to communication between the first device 104 and the third device (i.e., the display controller 426 in the example of FIG. 4). For example, the first device 104 and the third device may communicate via a bus 408 (e.g., a synchronous bus). Structure and operation of the second switch 406 may be as described with reference to the switch 112. Structure and operation of the third header switch 402 may be as described with reference to any of the header switches 108, 110.

In a particular aspect, the processor 410, the display controller 426, the memory 432, the CODEC 434, the wireless interface 440, the switches 112, 406, and the header switches 108, 110, and 402 are included in a package, a system-in-package (SiP) device, and/or a system-on-chip (SoC) device, such as an SoC device 422. Further, an input device 430 and a power supply 444 may be coupled to the SoC device 422. Moreover, in a particular aspect, as illustrated in FIG. 4, the display 428, the input device 430, the speaker 436, the microphone 438, the antenna 442, and the power supply 444 are external to the SoC device 422. However, each of the display 428, the input device 430, the speaker 436, the microphone 438, the antenna 442, and the power supply 444 can be coupled to a component of the SoC device 422, such as to an interface or to a controller.

To further illustrate, the SoC device 422 may integrated within a package that includes the package layers 103 of FIG. 1. The SoC device 422 may be integrated within the package in a flip-chip configuration, such as using the bumps 105, 107 to couple the SoC device 422 to a surface of the package. One or more signals may be sent and received by components of the electronic device 400 via the package layers 103 and the bumps 105, 107. For example, the power supply 444 may include a battery that generates a voltage. The voltage may be routed through the package layers 103 to the bumps 105, 107 to generate the supply voltage VDD of FIG. 1.

It is noted that the first supply voltage VDD1 and the second supply voltage VDD2 may be generated by (e.g., derived from) a common power supply, such as the power supply 444. As an illustrative example, the common power supply may correspond to (or may be generated using) a battery. To further illustrate, the electronic device 400 may be a mobile device, the power supply 444 may include a battery that powers the mobile device, and the first supply voltage VDD1 and the second supply voltage VDD2 may be generated using the battery. In other cases, the electronic device 400 may correspond to a wired device, such as a desktop computer or a television, as illustrative examples. In this case, the power supply 444 may be provided via a mains electricity supply or another power supply.

In a particular aspect, a non-transitory computer-readable medium (e.g., the memory 202, the memory 252, or the memory 432) stores instructions (e.g., the routine 203, the routine 253, or the instructions 468) that are executable by a processor (e.g., the processor 410) to initiate operations. For example, the instructions may be executable by the first device 104, by the second device 106, by another device of the processor 410, or a combination thereof. The operations include activating a switch (e.g., the switch 112) to couple a first node (e.g., the first node 120) and a second node (e.g., the second node 122). The first node provides a first supply voltage (e.g., the first supply voltage VDD1) to a first device (e.g., the first device 104), and the second node provides a second supply voltage (e.g., the second supply voltage VDD2) to a second device (e.g., the second device 106). The first device and the second device are communicatively coupled via a bus (e.g., the bus 114).

In another example, an apparatus (e.g., any of the electronic devices 100, 200, and 400) includes means for providing (e.g., the first node 120) a first supply voltage (e.g., the first supply voltage VDD1) to a first device (e.g., the first device 104). The apparatus further includes means for providing (e.g., the second node 122) a second supply voltage (e.g., the second supply voltage VDD2) to a second device (e.g., the second device 106). The apparatus further includes means for communicatively coupling (e.g., the bus 114) the first device and the second device. The apparatus further includes means for coupling the means for providing the first supply voltage and the means for providing the second supply voltage. The means for coupling may include the switch 112.

The foregoing disclosed devices and functionalities may be designed and represented using computer files (e.g., RTL, GDSII, GERBER, etc.). The computer files may be stored on computer-readable media. Some or all such files may be provided to fabrication handlers who fabricate devices based on such files. Resulting products include wafers that are then cut into die and packaged into integrated circuits (or "chips"). The chips are then employed in electronic devices, such as within the electronic device 400 of FIG. 4.

Although one or more of FIGS. 1-4 may illustrate systems, apparatuses, and/or methods according to the teachings of the disclosure, the disclosure is not limited to these illustrated systems, apparatuses, and/or methods. For example, certain examples have been described with reference to devices that may be included in a single integrated circuit (such as the devices 104, 106 that may be included in the SoC device 422). It is noted that structures and operations of the present disclosure may be employed in other applications, such as in other configurations that utilize separate supply voltages in connection with multiple voltage domains (or voltage "islands"). For example, multiple integrated circuits coupled to a printed circuit board (PCB) may communicate using a synchronous bus or other connection. In this example, the switch 112 may enable voltage equalization between the multiple integrated circuits, such as multiple integrated circuits having a stacked configuration, as an illustrative example. Thus, the present disclosure may be applied to inter-chip communications as well as intra-chip communications. Alternatively or in addition, a switch may enable voltage equalization between one or more other devices (e.g., between the display controller 426 and the display 428, as an illustrative example).

Further, although certain examples are described using two devices (the devices 104, 106) for clarity of illustration, it should be appreciated that the present disclosure is applicable to configurations with more than two devices. For example, the present disclosure is applicable to any positive integer number N of devices, where N>1 (e.g., for N=2, N=3, N=4, or N=10, as illustrative examples). To illustrate, the processor 410 may further include at least a third device (e.g., the display controller 426). The third device may be coupled to one or both of the devices 104, 106, such as via a second bus and/or a third bus, which may correspond to the bus 408. In this example, a second switch (e.g., the second switch 406) and/or a third switch may be coupled to the second bus and/or the third bus. In other examples, the processor 410 may include four or more devices (e.g., four or more processor cores).

In certain implementations, a supply voltage may be "re-routed" through the package layers 103. For example, the node 120 may be coupled to the package layers 103 through a third flip chip bump. The first supply voltage VDD1 may be routed to the package layers 103 through the third flip chip bump and re-routed back through a fourth flip chip bump. Alternatively or in addition, the node 122 may be coupled to the package layers 103 through a fifth flip chip bump. The second supply voltage VDD2 may be routed to the package layers 103 through the fifth flip chip bump and re-routed back through a sixth flip chip bump. Rerouting a supply voltage may enable delivery of the supply voltage to a different terminal of an integrated circuit, may alter a power consumption characteristic (e.g., due to reduced resistance of a metal layer, such as an RDL, which may correspond to one of the package layers 103), or a combination thereof.

Techniques described herein may enable interfacing of devices having timing "critical" communication. For example, if the devices 104, 106 communicate using a synchronous technique with "critical" timing, the switch 112 may enable interfacing between the devices 104, 106. In addition, the switch 112 may enable a communication between the devices 104, 106 to comply with a timing specification associated with the bus 114, such as by enabling reduced or fixed delay associated with the communication and/or by maintaining a critical timing associated with the communication (e.g., by reducing or avoiding timing delays associated with changes in supply voltages). The switch may enable independence of package design and product design. For example, conventional techniques may design a package based on expected variations in supply voltages during operation of a device having a particular design. Other techniques may modify product design (e.g., by modifying a header switch configuration or by changing a synchronous communication channel to an asynchronous communication channel) so that the product is compatible with a particular package design. Because techniques of the present disclosure may enable supply voltage adjustment without substantially altering package design or product design, cost and complexity associated with product design, fabrication, and assembly (e.g., packaging) may be reduced due to independence of package design and product design.

Further, one or more functions or components of any of FIGS. 1-4 as illustrated or described herein may be combined with one or more other portions of another of FIGS. 1-4. Accordingly, no single aspect described herein should be construed as limiting and examples of the disclosure may be suitably combined without departing from the teachings of the disclosure.

Those of skill would further appreciate that the various illustrative logical blocks, configurations, modules, circuits, and algorithm steps described in connection with the examples described herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the examples described herein may be embodied directly in hardware, in a software module executed by a processor, or in a combination thereof. For example, operations of the method 300 of FIG. 3 may be implemented using hardware, executable instructions, or a combination thereof. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transitory storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed aspects is provided to enable a person skilled in the art to make or use the disclosed aspects. Various modifications to these aspects will be readily apparent to those skilled in the art, and the principles defined herein may be applied to other aspects without departing from the scope of the disclosure. Thus, the present disclosure is not intended to be limited to the aspects shown herein but is to be accorded the widest scope possible consistent with the principles and novel features as defined by the following claims.

What is claimed is:
1. An apparatus comprising:
    a first node configured to provide a first supply voltage to a first device;
    a second node configured to provide a second supply voltage to a second device;
    a bus configured to communicatively couple the first device and the second device;
    a switch configured to selectively couple the first node and the second node in response to a difference between a first value of the first supply voltage at the first node and a second value of the second supply voltage at the second node; and
    a comparator coupled to the first node and to the second node, wherein the comparator is configured to determine the difference.
2. The apparatus of claim 1, wherein the comparator is further configured to activate the switch in response to the difference exceeding a threshold, wherein the first supply voltage and the second supply voltage are derived from a common supply voltage, and wherein the bus is configured to synchronously communicatively couple the first device to the second device.
3. The apparatus of claim 2, further comprising:
    a battery configured to generate the common supply voltage; and a plurality of package layers, wherein the common supply voltage is routed through the plurality of package layers.

4. The apparatus of claim 2, further comprising:
a first header switch coupled to the first node and configured to receive the common supply voltage; and
a second header switch coupled to the second node and configured to receive the common supply voltage.

5. The apparatus of claim 1, further comprising:
at least a third device configured to receive a third supply voltage via a third node; and
a second switch configured to couple the first node and the third node in response to communication between the first device and the third device, wherein the second switch is configured to close in response to a second difference between the first value of the first supply voltage at the first node and a third value of a third supply voltage at the third node.

6. The apparatus of claim 1, wherein the first device is included in a first integrated circuit, wherein the second device is included in a second integrated circuit, and wherein the first integrated circuit and the second integrated circuit have a stacked configuration.

7. The apparatus of claim 1, wherein the switch is configured to be activated in response to a communication over the bus, and wherein while the switch is activated, the switch is configured to substantially equalize the first value of the first supply voltage and the second value of the second supply voltage via a low-impedance path.

8. The apparatus of claim 1, wherein the bus is a synchronous bus, wherein the switch is configured to couple the first node and the second node during communication between the first device and the second device via the bus, wherein while the switch is activated, the switch is configured to provide a low-impedance path that couples the first node and the second node such that the first voltage substantially matches the second value of the second voltage, and wherein while the switch is deactivated, the first device is configured to receive the first value of the first supply voltage via a first path and the second device is configured to receive the second value of the second supply voltage via a second path.

9. The apparatus of claim 1, wherein the switch is configured to be deactivated in response to one or more of the first device or the second device initiating or entering a sleep mode.

10. The apparatus of claim 1, wherein the first device includes a first processor core, and wherein the second device includes a second processor core.

11. The apparatus of claim 2, further comprising:
a first header switch coupled to the first device via the first node, wherein the first node is positioned between the first header switch and the first device; and
a second header switch coupled to the second device via the second node, wherein the second node is positioned between the second header switch and the second device, and wherein the first header switch and the second header switch are configured to receive the common supply voltage.

12. The apparatus of claim 11, further comprising:
a first flip chip bump coupled to the first header switch; and
a second flip chip bump coupled to the second header switch.

13. The apparatus of claim 11, wherein the switch, the first header switch, and the second header switch each include a p-type metal-oxide-semiconductor field-effect transistor (pMOSFET).

14. The apparatus of claim 1, wherein the first node, the second node, the bus, and the switch are integrated within a mobile device, a computer, a set top box, an entertainment unit, a navigation device, a personal digital assistant (PDA), a television, a tuner, a radio, a music player, or a video player.

15. A method comprising:
while a switch is deactivated:
providing a first supply voltage to a first device, wherein the first supply voltage is provided to the first device via a first node; and
providing a second supply voltage to a second device, wherein the second supply voltage is provided to the second device via a second node; and
activating the switch to couple the first node and the second node in response to a difference between a first value of the first supply voltage at the first node and a second value of the second supply voltage at the second node; and
determining the difference at a comparator coupled to the first node and to the second node.

16. The method of claim 15, wherein the switch is activated during communication between the first device and the second device via a bus, and further comprising:
comparing, by the comparator, the difference to a threshold; and
deactivating the switch in response to the difference failing to satisfy the threshold.

17. The method of claim 15, wherein the first supply voltage is provided to the first device via the first node while a first header switch is activated, and wherein the second supply voltage is provided to the second device via the second node while a second header switch is activated.

18. The method of claim 17, further comprising deactivating the switch in response to deactivation of one or both of the first header switch or the second header switch.

19. The method of claim 18, wherein the switch is activated in response to activation of both the first header switch and the second header switch.

20. The method of claim 15, wherein the switch is activated based on a comparison, by the comparator, between a threshold value and the difference between the first value and the second value.

21. An apparatus comprising:
means for providing a first supply voltage to a first device;
means for providing a second supply voltage to a second device;
means for communicatively coupling the first device and the second device;
means for selectively coupling a first node of the means for providing the first supply voltage to a second node of the means for providing the second supply voltage, wherein the means for selectively coupling is activated in response to a difference between a first value of the first supply voltage at the first node and a second value of the second supply voltage at the second node; and
means for determining the difference, the means for determining the difference coupled to the first node and to the second node.

22. The apparatus of claim 21, wherein the means for communicatively coupling includes a bus, wherein the bus is coupled between the first device and the second device, and wherein the means for selectively coupling is activated in response to a communication over the bus.

23. The apparatus of claim 21, wherein the first device includes a first processor core, and wherein the second device includes a second processor core further comprising:
   means for providing a third supply voltage to a third device; and
   means for selectively coupling the means for providing the first supply voltage to the means for providing the third supply voltage.

24. The apparatus of claim 23, wherein the first device includes a first processor core, the second device includes a second processor core, and the third device includes a controller.

25. The apparatus of claim 21, wherein the means for providing the first supply voltage, the means for providing the second supply voltage, the means for communicatively coupling, and the means for selectively coupling are integrated within a mobile device, a computer, a set top box, an entertainment unit, a navigation device, a personal digital assistant (PDA), a television, a tuner, a radio, a music player, or a video player.

26. A non-transitory computer-readable medium storing instructions that are executable by a processor to initiate operations, the operations comprising:
   activating a switch to selectively couple a first node and a second node, the first node providing a first value of a first supply voltage to a first device and the second node providing a second value of a second supply voltage to a second device, the first device and the second device communicatively coupled via a bus, wherein the switch is activated in response to a difference between the first value and the second value; and
   determining the difference at a comparator coupled to the first node and to the second node.

27. The non-transitory computer-readable medium of claim 26, wherein the first device includes a first processor core of the processor, and wherein the second device includes a second processor core of the processor.

28. The non-transitory computer-readable medium of claim 26, wherein the operations further comprise deactivating the switch to selectively decouple the first node from the second node, and wherein, while the switch is deactivated, the first value of the first supply voltage is provided to the first device and the second value of the second supply voltage is provided to the second device.

29. The non-transitory computer-readable medium of claim 26, wherein the first supply voltage is provided to the first device while a first header switch is activated, and wherein the second supply voltage is provided to the second device while a second header switch is activated.

30. The non-transitory computer-readable medium of claim 26, wherein the processor is included in a mobile device, and wherein the first supply voltage and the second supply voltage are derived from a common power supply.

* * * * *